US012572706B2

(12) United States Patent
Rajpathak et al.

(10) Patent No.: US 12,572,706 B2
(45) Date of Patent: Mar. 10, 2026

(54) CROSS DOMAIN VOLTAGE GLITCH DETECTION CIRCUIT FOR ENHANCING CHIP SECURITY

(71) Applicant: NVIDIA Corp., Santa Clara, CA (US)

(72) Inventors: Kedar Rajpathak, Bangalore (IN);
Tezaswi Raja, San Jose, CA (US)

(73) Assignee: NVIDIA Corp, Santa Clara, CA (US)

( * ) Notice: Subject to any disclaimer, the term of this patent is extended or adjusted under 35 U.S.C. 154(b) by 1109 days.

(21) Appl. No.: 16/294,788

(22) Filed: Mar. 6, 2019

(65) Prior Publication Data

US 2020/0285780 A1      Sep. 10, 2020

(51) Int. Cl.
| | |
|---|---|
| *G06F 21/85* | (2013.01) |
| *G06F 21/55* | (2013.01) |
| *H02H 1/00* | (2006.01) |
| *H02H 3/20* | (2006.01) |

(52) U.S. Cl.
CPC ............ *G06F 21/85* (2013.01); *G06F 21/556* (2013.01); *H02H 1/0007* (2013.01); *H02H 3/20* (2013.01)

(58) Field of Classification Search
CPC ..... G06F 21/85; G06F 21/556; H02H 1/0007; H02H 3/20; G01R 19/165; G01R 19/16566
See application file for complete search history.

(56) References Cited

U.S. PATENT DOCUMENTS

| | | | |
|---|---|---|---|
| 4,965,474 A | 10/1990 | Childers et al. | |
| 5,506,808 A * | 4/1996 | Yamada ................. | G11C 11/419 |
| | | | 365/177 |
| 6,078,201 A * | 6/2000 | Crotty .................. | H03K 17/223 |
| | | | 327/143 |
| 6,215,342 B1 | 4/2001 | Morrill | |
| 6,505,262 B1 | 1/2003 | Kurd et al. | |
| 6,745,337 B1 | 6/2004 | Trivedi et al. | |
| 7,388,414 B1 | 6/2008 | Pasqualini | |
| 7,725,769 B1 | 5/2010 | Staab | |
| 9,515,637 B1 * | 12/2016 | Schnaitter ............ | H03K 17/223 |
| 10,013,042 B1 | 7/2018 | Abhishek et al. | |
| 10,032,520 B2 * | 7/2018 | Shao ......................... | H02J 4/00 |
| 10,474,846 B1 * | 11/2019 | Rezayee ................. | G07F 9/026 |
| 2002/0186038 A1 | 12/2002 | Bretschneider | |

(Continued)

FOREIGN PATENT DOCUMENTS

| | | | | |
|---|---|---|---|---|
| CN | 103034804 A | * | 4/2013 | |
| DE | 102020104630 A1 | | 9/2020 | |

(Continued)

OTHER PUBLICATIONS

Khan, Qadeer A., "Reducing system complexity by using a single-supply logic-level shifter", Jul. 1, 2008, EETimes (Year: 2008).*

(Continued)

*Primary Examiner* — Lynn D Feild
*Assistant Examiner* — Ethan V Vo
(74) *Attorney, Agent, or Firm* — Carnelian Law, LLC

(57) ABSTRACT
A glitch detection circuit includes a supply power glitch detection circuit in a first power domain and a ratioed inverter in a second power domain different than the first power domain. The glitch detection circuit may be used in a method to detect cross-power domain glitches.

11 Claims, 7 Drawing Sheets

(56)     References Cited

U.S. PATENT DOCUMENTS

| | | | |
|---|---|---|---|
| 2003/0226082 A1* | 12/2003 | Kim | G06K 19/073 |
| | | | 714/734 |
| 2005/0195000 A1* | 9/2005 | Parker | H03K 17/223 |
| | | | 327/143 |
| 2006/0033549 A1* | 2/2006 | Huang | H03K 3/356113 |
| | | | 327/333 |
| 2007/0115007 A1 | 5/2007 | Ogiwara et al. | |
| 2007/0250721 A1 | 10/2007 | Searles et al. | |
| 2008/0061843 A1 | 3/2008 | Yanci | |
| 2009/0027102 A1 | 1/2009 | Fayed | |
| 2010/0231255 A1* | 9/2010 | Kim | H03K 19/0013 |
| | | | 326/95 |
| 2012/0257430 A1* | 10/2012 | Truettner | H02M 7/487 |
| | | | 363/131 |
| 2014/0075233 A1* | 3/2014 | Bartling | G06F 11/1469 |
| | | | 713/324 |
| 2015/0346246 A1 | 12/2015 | Tasher et al. | |
| 2017/0177870 A1* | 6/2017 | Hildebrand | G06F 21/57 |
| 2017/0272879 A1 | 9/2017 | Kropfitsch et al. | |
| 2017/0346280 A1* | 11/2017 | Stockinger | G01R 31/2856 |
| 2018/0164351 A1 | 6/2018 | Nirwan et al. | |
| 2020/0091912 A1 | 3/2020 | Kawai et al. | |
| 2020/0386797 A1* | 12/2020 | Stark | G01R 19/165 |

FOREIGN PATENT DOCUMENTS

| | | | |
|---|---|---|---|
| JP | 2722582 B2 * | 3/1998 | |
| JP | 2005092693 A * | 4/2005 | |

OTHER PUBLICATIONS

Wikipedia, "Open Collector", Jul. 4, 2017 (Year: 2017).*
Vai, M. Michael, VLSI Design, 2017, CRC Press, p. 178 (Year: 2017).*
Stack Exchange, "Single Transistor Level Up Shifter", Apr. 20, 2017 (Year: 2017).*
Shiva SG, editor. Introduction to logic design. CRC Press; Oct. 3, 2018, pp. 520-525 (Year: 2018).*
"Potentiometer vs. Transistor", Stack Exchange, Jun. 29, 2013 (Year: 2013).
"Single transistor level up shifter", Stack Exchange, Apr. 20, 2017 (Year: 2017).

* cited by examiner

300

START

RECEIVE A SUPPLY VOLTAGE IN FIRST POWER DOMAIN 302

APPLY SUPPLY VOLTAGE TO GLITCH DETECTION CIRCUIT RESULTING IN OUTPUT SIGNAL 304

ASSERT OR DE-ASSERT OUTPUT SIGNAL IN SECOND POWER DOMAIN, WHEREIN OUTPUT SIGNAL IS BASED ON SUPPLY VOLTAGE LEVEL IN FIRST POWER DOMAIN 306

DONE

400

CROSS DOMAIN VOLTAGE GLITCH DETECTION CIRCUIT FOR ENHANCING CHIP SECURITY

BACKGROUND

Protecting integrated circuits against power supply glitch attacks has become increasingly important in recent times. Glitch attacks are common in many devices that utilize integrated circuits for gaming, automotive, and servers, for example. A glitch attack is an intentional fault introduced to undermine device security. The faults can cause instruction skipping, instruction decoding errors, and improper data read and write backs. An electrical type of glitch attack can target the clock or the power systems. A power glitch attack may involve a pull to ground (i.e., brownout) or an increase in voltage (i.e., spiking).

Supply voltage glitching is popular hardware attack. By glitching the power supply voltage, a hacker may either bypass a device authentication process or enter unauthorized logic through Joint Test Action Group (JTAG) access. If glitch attacks can be detected, they may be prevented for example by resetting the logic under attack.

BRIEF SUMMARY

A glitch detection circuit may comprise a supply power glitch detection circuit in a first power domain and a ratioed inverter in a second power domain different than the first power domain. The supply power glitch detection circuit may include a first pull-up resistor and a first pull-down transistor in series, and a first inverter coupled to a junction node of the first pull-up resistor and the first pull-down transistor. The ratioed inverter may include a second pull-up resistor and a second pull-down transistor in series, and a second inverter coupled to a junction node of the second pull-up resistor and the second pull-down transistor.

A method of detecting a power glitch may include receiving a supply voltage in a first power domain and applying the supply voltage to a glitch detection circuit resulting in an output signal. The glitch detection circuit may include a supply power glitch detection circuit in the first power domain and a ratioed inverter in a second power domain different than the first power domain. The method asserts or de-asserts the output signal in the second power domain, wherein the output signal is based on the supply voltage level in the first power domain.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Generally, SoCs have multiple voltage domains, each operating at a different voltage. Various voltage domains may include RTC, SoC, CPU, GPU, and CV. In such SoCs, if there is a voltage glitch attack on a particular rail, then it is desirable to detect it and assert/de-assert a signal in other voltage domains, alerting them of the glitch attack.

A conventional glitch detection circuit can only work within its domain. Additionally, a level translator can only translate a level of a signal from an active/ON domain and not from a "voltage glitched" domain. Thus, using conventional circuits, if a domain undergoes a glitch attack it cannot produce a reliable signal that can be level translated into other domains.

Figure 1:
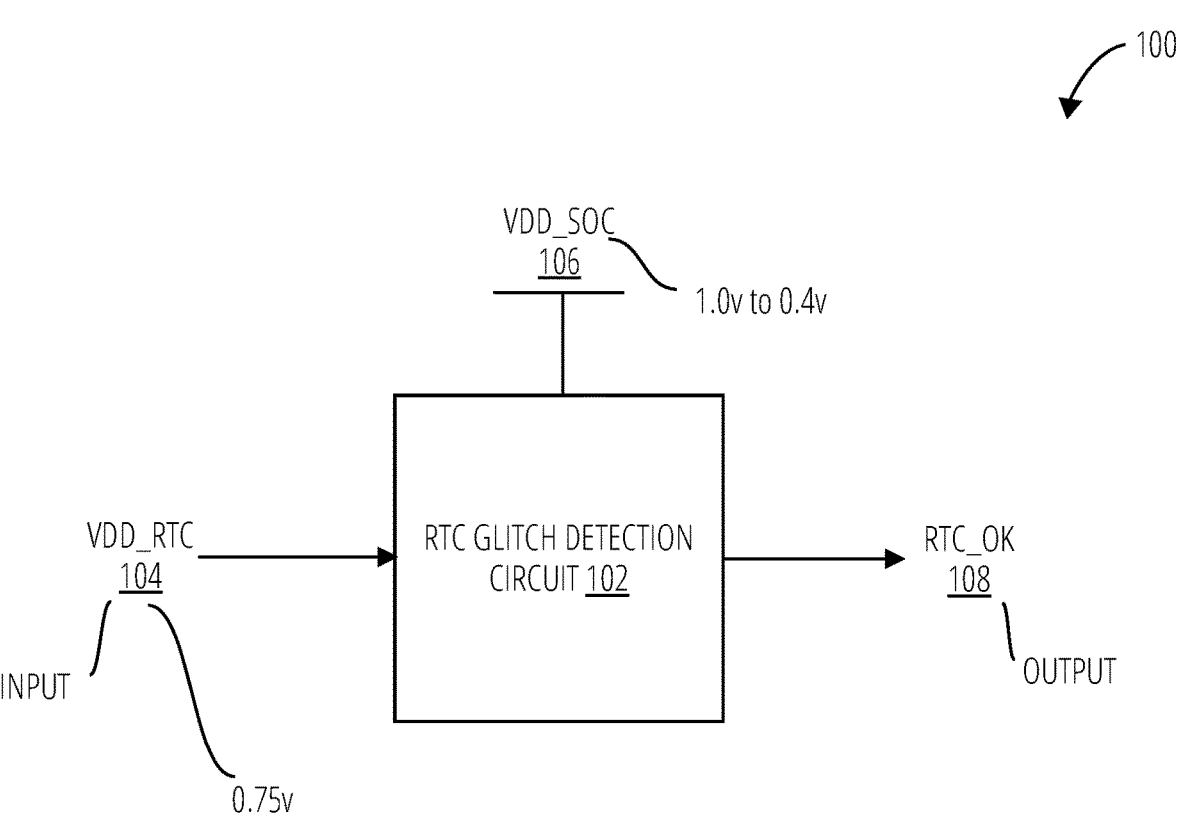
FIG. 1 illustrates a cross-domain glitch detection system 100 in accordance with one embodiment.

Referring to FIG. 1, a cross-domain glitch detection system 100 comprises an RTC glitch detection circuit 102, an RTC domain fixed rail voltage VDD_RTC 104, an SOC domain supply voltage VDD_SOC 106, and an RTC_OK 108 signal (i.e., logic output). "VDD" refers to the positive supply voltage of a CMOS, NMOS, or PMOS device. In this exemplary embodiment, the RTC and SoC domains are referenced, but the disclosure is not limited thereto. In various embodiments, the voltage domains may include RTC, SoC, CPU, GPU, and CV domains in any combination. RTC refers to "real-time clock, typically based on an oscillator circuit, often used in integrated circuits for timing and/or clocking purposes. SoC refers to "system-on-a-chip" an integrated circuit that includes many common components utilized in electronic devices. "CPU" refers to a central processing unit responsible for executing instructions of a computer program, and "GPU" refers to a graphics processing unit that is an electronic circuit design to rapidly carry out certain advanced computations.

The different domains may operate with different voltages and voltage ranges. For example, VDD_RTC 104 may be a fixed voltage rail at 0.75v. By contrast, VDD_SOC 106 may vary between 1.0v and 0.4v.

The RTC glitch detection circuit 102 takes VDD_RTC 104 as an input, asserts or de-asserts an "OK" signal RTC_OK 108 in other voltage domains, such as VDD_SOC 106, where the signal is based on the VDD_RTC 104 level. As an example, if an RTC rail is attacked/glitched, then the RTC glitch detection circuit 102 may detect the glitch and de-assert the signal RTC_OK 108 in other domains, such as in the SoC domain. The other domain receiving the RTC_OK 108 signal may take certain actions depending on the value of the signal. For example, RTC_OK 108 indicating an abnormal operating condition could be applied in the other domain to initiate a chip reset, disable secure logic blocks, alert a master CPU, alert a controller, and shut off power rails.

Figure 2:
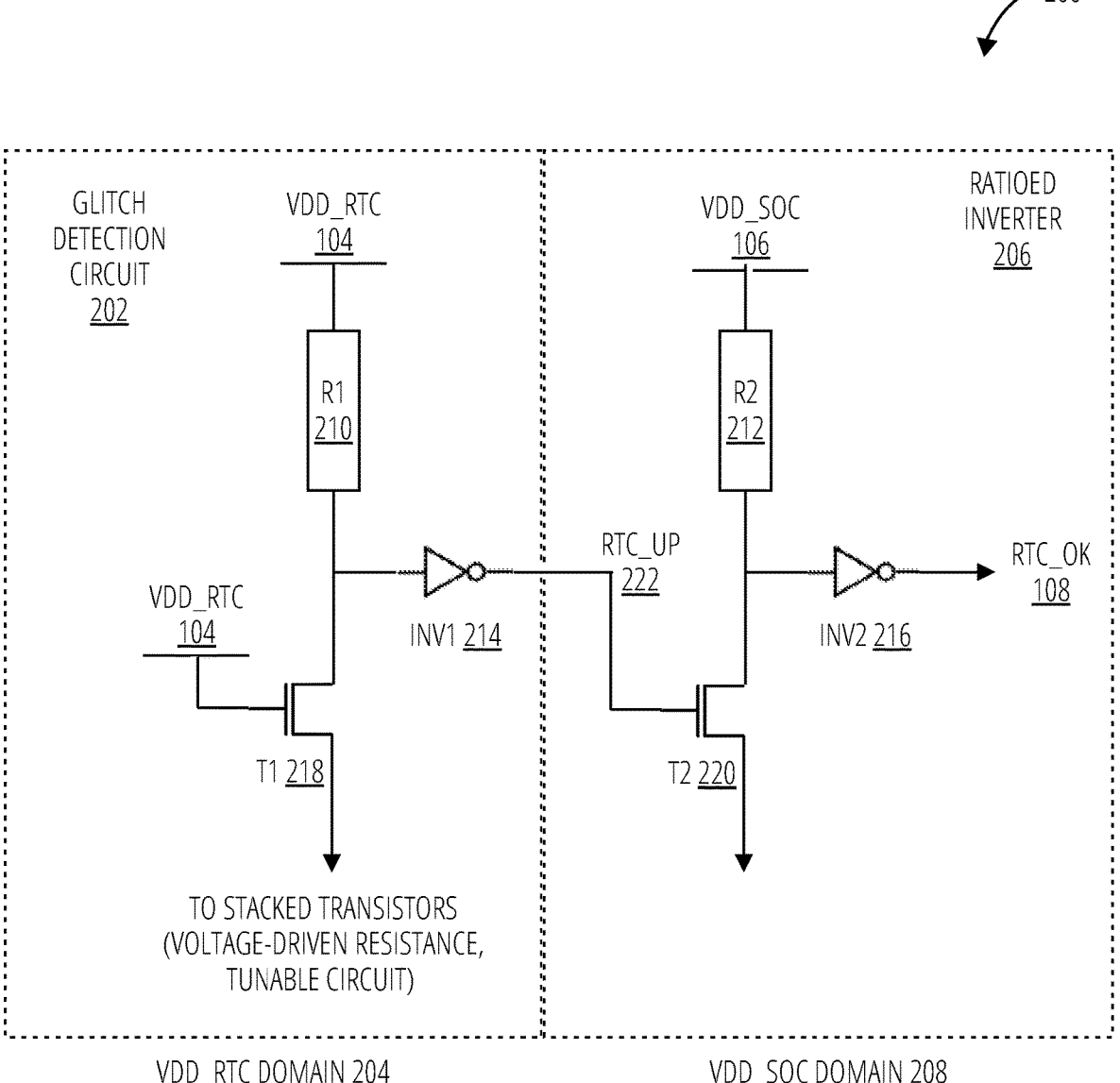
FIG. 2 illustrates a cross-domain glitch detection circuit 200 in accordance with one embodiment.

Referring to FIG. 2, a cross-domain glitch detection circuit 200 comprises a glitch detection circuit 202 and a ratioed inverter 206. The glitch detection circuit 202 may be coupled to a power rail VDD_RTC 104 in the power domain to be sensed for a glitch attack (e.g., the real-time clock power domain). The output of glitch detection circuit 202, RTC_UP 222, may drive a pull-down transistor T2 220 of the ratioed inverter 206 in a different domain (e.g., the SoC domain), thus coupling the different domain to the power rail of the domain under glitch attack (e.g., the RTC domain).

The ratioed inverter 206 may operate as a voltage level translator and may comprise a second pull-up resistor R2 212 and a pull-down transistor T2 220 in series, which may be NMOS or PMOS. The output of the glitch detection circuit 202, RTC_UP 222, may drive the pull-down transistor, T2 220, of the ratioed inverter 206. A "pull-up resistor" refers to a resistor used to ensure a known state for a signal. For a switch that connects to ground, a pull-up resistor ensures a well-defined voltage (i.e. VDD) across the remainder of the circuit when the switch is open.

Referring to the cross-domain glitch detection circuit 200, a power rail voltage of the RTC domain (the first power domain), VDD_RTC 104, is coupled, either directly or indirectly, to the gate of T1 218 of the VDD_RTC domain 204. T1 218 may be a single transistor or may be a plurality of transistors in series or other switching circuit. A series of stacked transistors may be utilized to provide a voltage-driven resistance, thus providing a field-tunable circuit.

As used herein, a component is said to be coupled directly to a signal if the signal is applied to the transistor without any intervening logic, and the transistors are coupled indirectly to a signal if the signal is coupled to the transistor with intervening logic. Intervening logic may be any type of discrete logic or electrical components such as resistors or capacitors.

VDD_RTC 104 is also coupled, either directly or indirectly, to a first pull-up resistor R1 210. A first inverter INV1 214 may be coupled to a junction node of the first pull-up resistor R1 210 and the first pull-down transistor T1 218. The first pull-down transistor T1 218 may also be coupled, either directly or indirectly, to other devices in the VDD_RTC domain 204, such as a stack of additional transistors. The output signal from INV1 214 is RTC_UP 222, which is passed to the ratioed inverter 206 in the VDD_SOC domain 208.

Referring to the ratioed inverter 206, the signal RTC_UP 222 from the VDD_RTC domain 204 is coupled, either directly or indirectly, to the gate of second pull-down transistor T2 220 of the VDD_SOC domain 208 (the second power domain). A power supply voltage VDD_SOC 106 for the second power domain may be coupled, either directly or indirectly, to a second pull-up resistor R2 212 in series with the second pull-down transistor T2 220, which may be NMOS or PMOS.

A second inverter INV2 216 may be coupled to a junction node of the second pull-up resistor R2 212 and the second pull-down transistor T2 220. The second pull-down transistor T2 220 may be coupled, either directly or indirectly, to other devices in the VDD_SOC domain 208. The output signal from the second inverter INV2 216 is RTC_OK 108, which indicates whether an alert should be triggered in the VDD_SOC domain 208 indicating a potential glitch attack. RTC_OK is applied to enable/disable the functional blocks, or to raise an alert of a potential glitch attack, e.g., chip reset, disabling secure logic blocks, and/or alerting master CPU.

Figure 3:
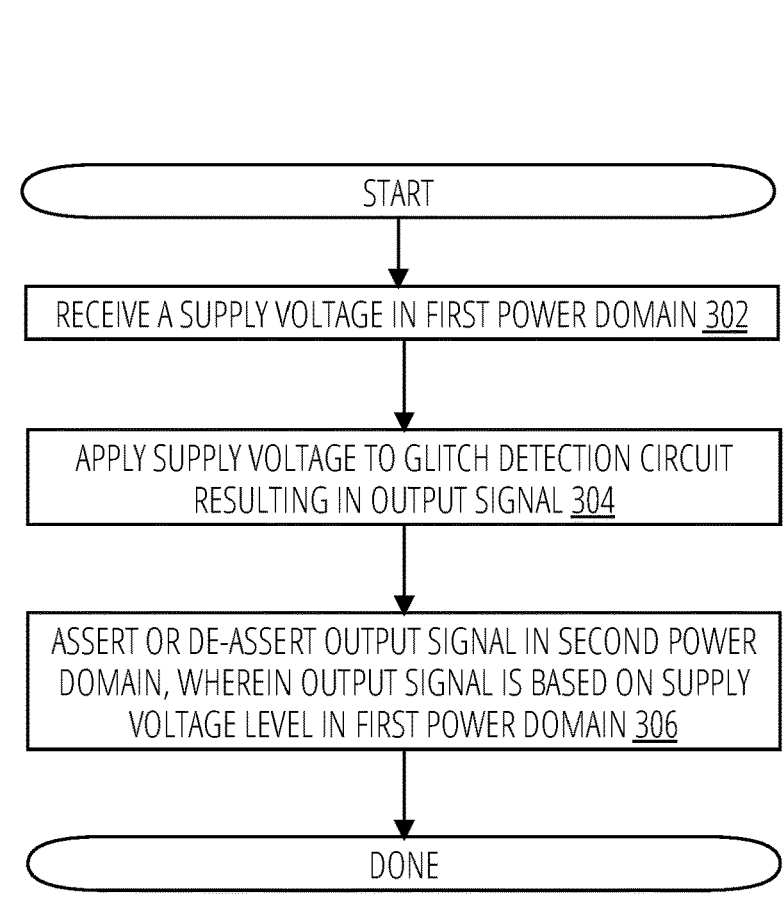
FIG. 3 illustrates a cross-domain glitch detection method 300 in accordance with one embodiment.

Referring to FIG. 3, a cross-domain glitch detection method 300 is illustrated that allows the detection of a power glitch in a first power domain and alerting a second power domain of the power glitch by asserting or de-asserting an signal in a second power domain.

In block 302, a cross-domain glitch detection method 300 receives a supply voltage in a first power domain. In block 304, cross-domain glitch detection method 300 applies the supply voltage to a glitch detection circuit resulting in an output signal, the glitch detection circuit comprising a supply power glitch detection circuit in the first power domain and a ratioed inverter in a second power domain different than the first power domain. In block 306, cross-domain glitch detection method 300 asserts or de-asserts the output signal in the second power domain, wherein the output signal is based on the supply voltage level in the first power domain.

The output signal may indicate an operating condition in the first power domain such that:

on condition the supply voltage in the first power domain is operating within a range that does not cause a trip, the output signal indicates a normal operating condition to the second power domain and is asserted in the second power domain; and on condition the supply voltage in the first power domain is operating within a range that causes a trip, the output signal indicates an abnormal operating condition to the second power domain and is de-asserted in the second power domain.

Figure 4:
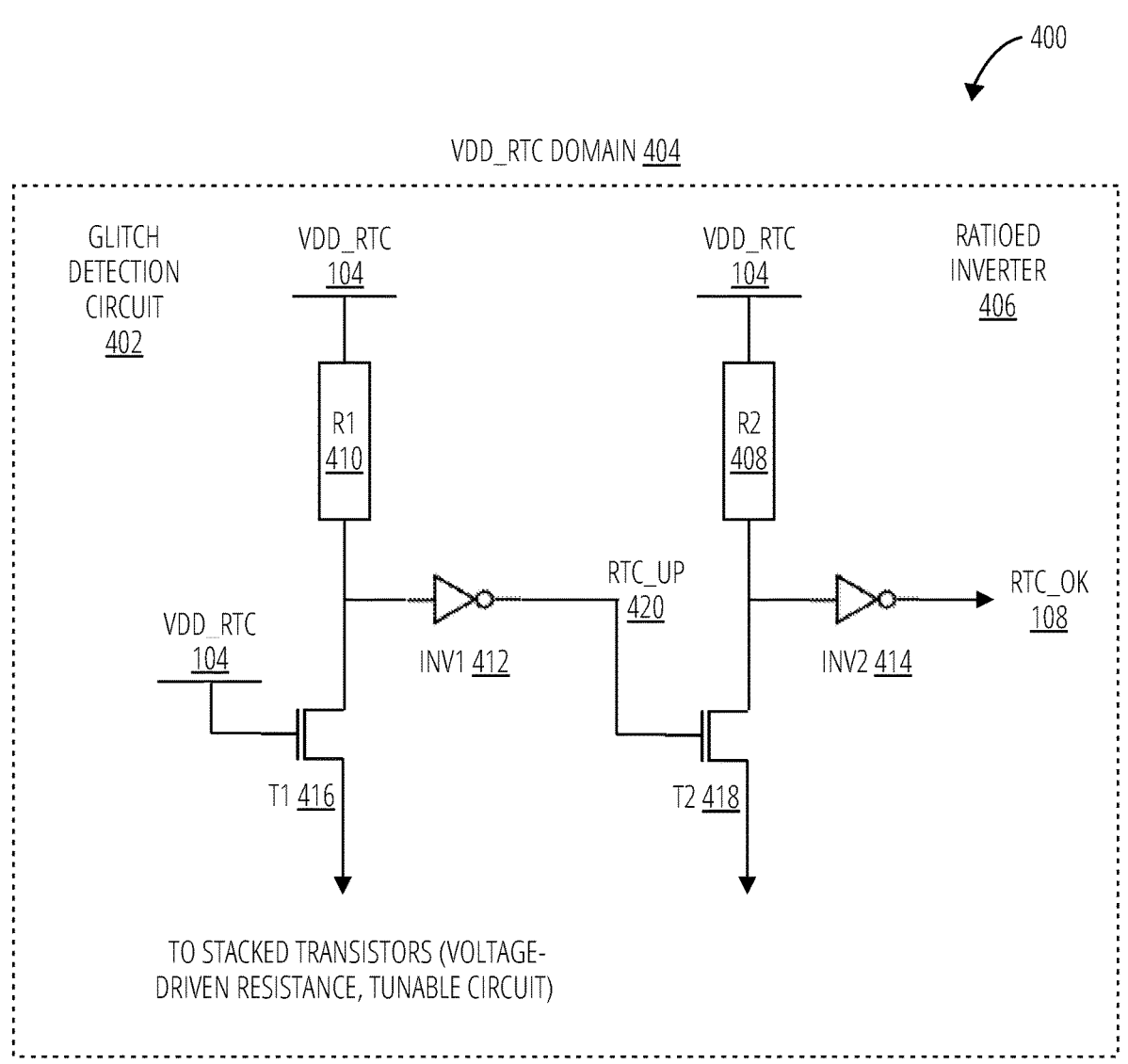
FIG. 4 illustrates an intra-domain glitch detection circuit 400 in accordance with one embodiment.

Referring to FIG. 4 an intra-domain glitch detection circuit 400 comprises a glitch detection circuit 402 and a ratioed inverter 406. The entire intra-domain glitch detection circuit 400 is located in a single power domain. The VDD_RTC domain 404 is used in this example, but the disclosure is not limited thereto. The glitch detection circuit 402 may be coupled to a power rail VDD_RTC 104. The output of glitch detection circuit 402, RTC_UP 420, may drive a pull-down transistor T2 418 of the ratioed inverter 406 in the same domain.

The ratioed inverter 406 may operate as a voltage level translator and may comprise, a pull-up resistor R2 408 and a pull-down transistor T2 418 in series, which may be NMOS or PMOS. The output of the glitch detection circuit 402, RTC_UP 420, may drive the pull-down transistor, T2 418, of the ratioed inverter 406.

A power rail voltage of the RTC domain, VDD_RTC 104, is coupled, either directly or indirectly, to the gate of first pull-down transistor T1 416. T1 416 may be a single transistor or may be a plurality of transistors in series (i.e., stacked transistors for tuning). VDD_RTC 104 is also coupled, either directly or indirectly, to a first pull-up resistor R1 410. A first inverter INV1 412 may be coupled to a junction node of the first pull-up resistor R1 410 and the first pull-down transistor T1 416. The first pull-down transistor T1 416 may be coupled, either directly or indirectly, to other devices in the VDD_RTC domain 404. The output signal from INV1 412 is RTC_UP 420, which is passed to the ratioed inverter 406.

The ratioed inverter 406 operates substantially the same as the ratioed inverter 206 for the cross-domain glitch detection circuit 200, except that the pull-down transistor T2 418 is coupled to VDD_RTC 104 via the pull-up resistor R2 408, instead of being coupled to the supply rail of a different power domain.

The signal RTC_UP 420 from the glitch detection circuit 402 is coupled, either directly or indirectly, to the gate of second pull-down transistor T2 418. A second inverter INV2 414 is coupled to a junction node of the second pull-up resistor R2 408 and the second pull-down transistor T2 418. The second pull-down transistor T2 418 may be coupled, either directly or indirectly, to other devices in the VDD_RTC domain 404. The output signal from the second inverter INV2 414 is RTC_OK 108, which indicates whether an alert should be triggered in the VDD_RTC domain 404.

Figure 5:
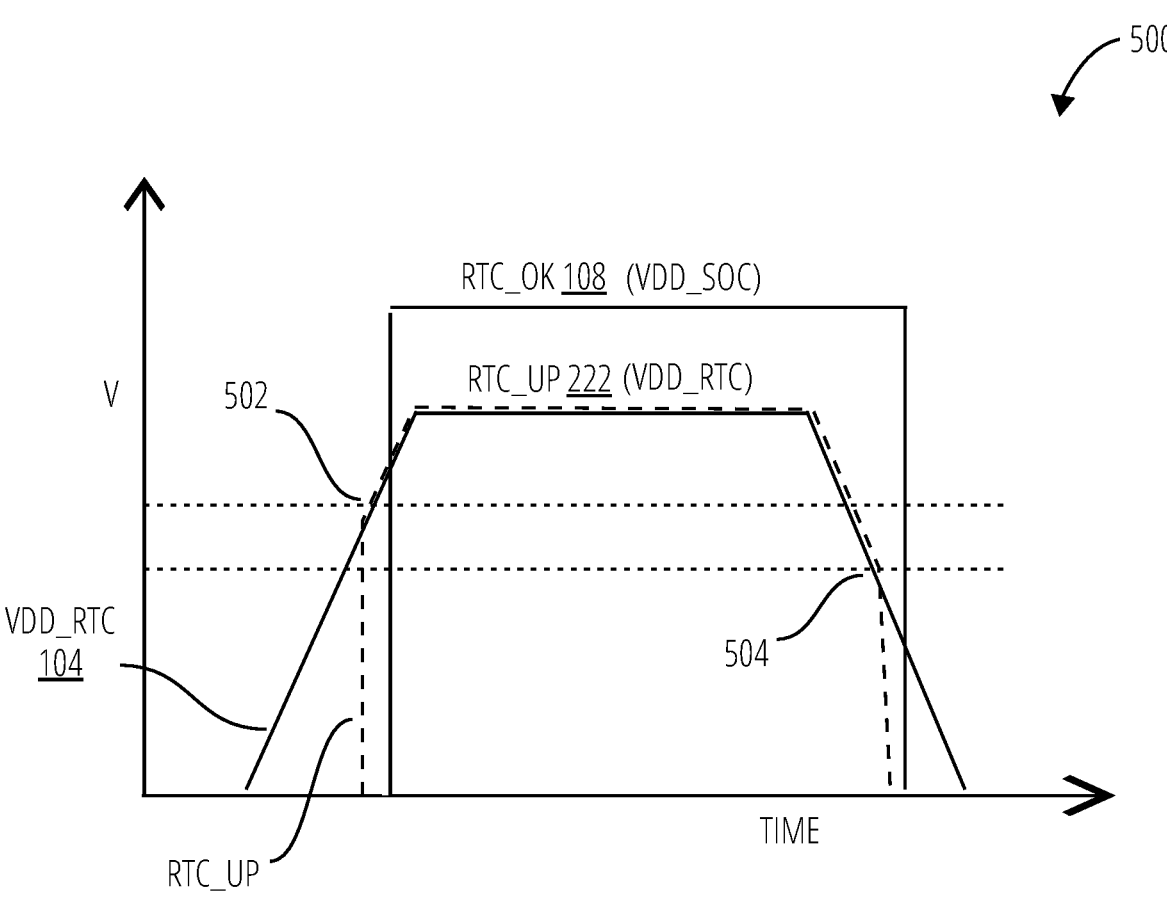
FIG. 5 illustrates a supply voltage profile 500 in accordance with one embodiment.

Referring to FIG. 5, a supply voltage profile 500 that may be generated by the glitch protection circuits disclosed herein is shown. A supply voltage VDD_RTC 104 in the VDD_RTC domain, when applied to a glitch detection circuit, may generate an RTC_UP 222 output that is passed to a ratioed inverter and used to drive a second pull-down transistor in the VDD_SOC domain. When the voltage VDD_RTC is at an operationally normal value (e.g., 0.75v), output RTC_UP 222=1. The second pull-down transistor in the ratioed inverter is ON, and a signal RTC_OK 108=1 is generated in the VDD_SOC domain.

When VDD_RTC is below a threshold value, then output RTC_UP 222=0. The second pull-down transistor in the ratioed inverter is OFF, and a signal RTC_OK 108=0 is generated in the VDD_SOC domain. When the value of RTC_OK 108=0, an alert may be triggered in the VDD_SOC domain based on an irregular voltage in the VDD_RTC domain.

As supply voltage profile 500 illustrates, the VDD_SOC remains within a normal operating range during the glitch, as is demonstrated by the RTC_OK 108 profile. But for the potential alert being triggered by a glitch in the VDD_RTC domain, the VDD_SOC domain may remain unaware of the glitch.

In various embodiments, there is a trip voltage V_trip_up 502 for a ramping up voltage in the VDD_RTC domain, and a trip voltage V_trip_down 504 for a ramping down voltage in the VDD_RTC domain. If VDD_RTC is >V_trip_up 502, then RTC_OK 108=1, indicating that no glitches have been detected. If VDD_RTC is <V_trip_down 504, then RTC_OK 108=0, indicating that a glitch may have been detected and that an alert may need to be generated in the VDD_SOC domain.

In an embodiment, it is possible to glitch VDD_RTC outside of the trigger points. This may occur if the glitch voltage is greater than V_trip_up 502 and greater than V_trip_down 504.

Figure 6:
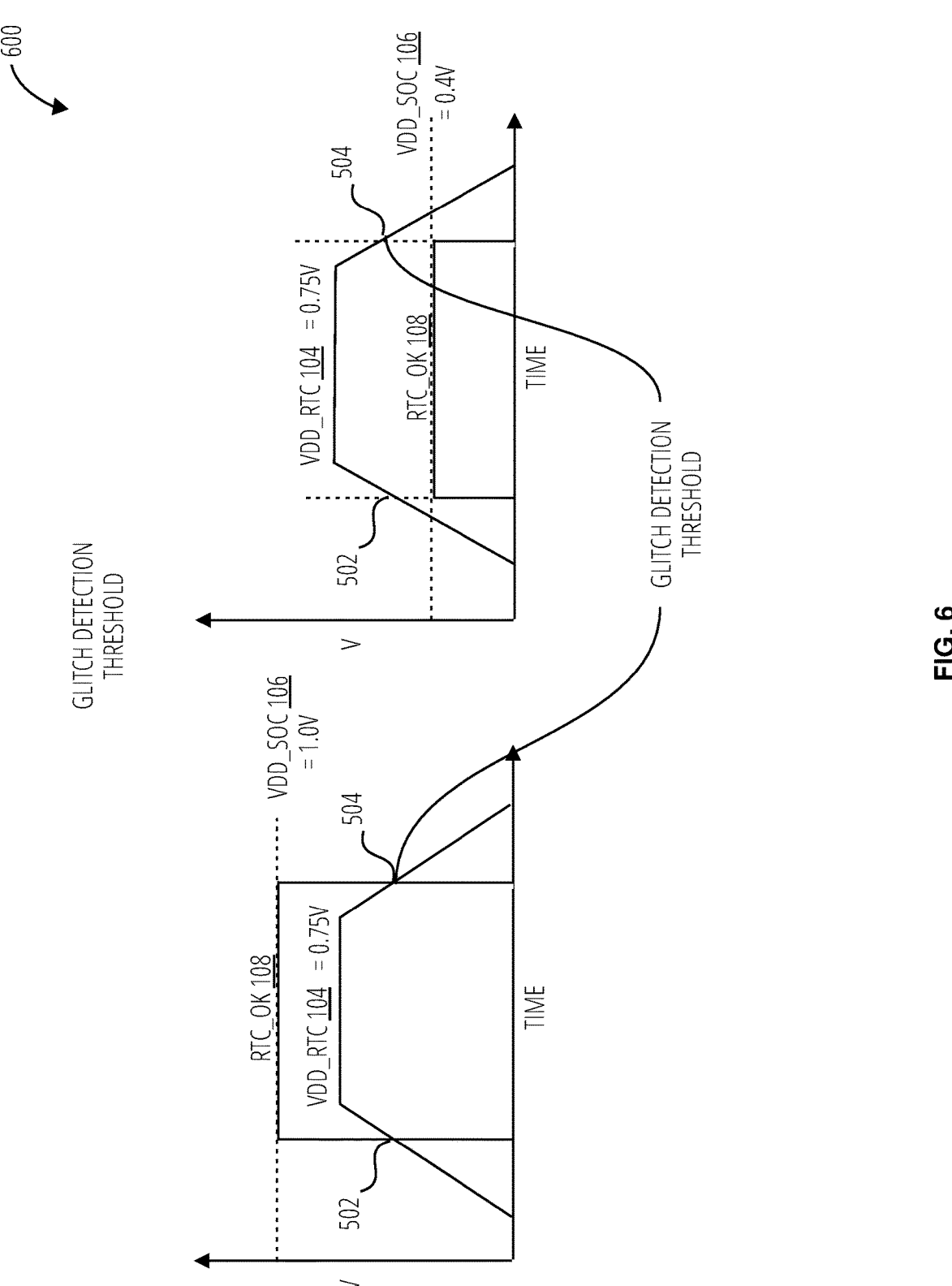
FIG. 6 illustrates a supply voltage profile 600 in accordance with one embodiment.
Figure 7:
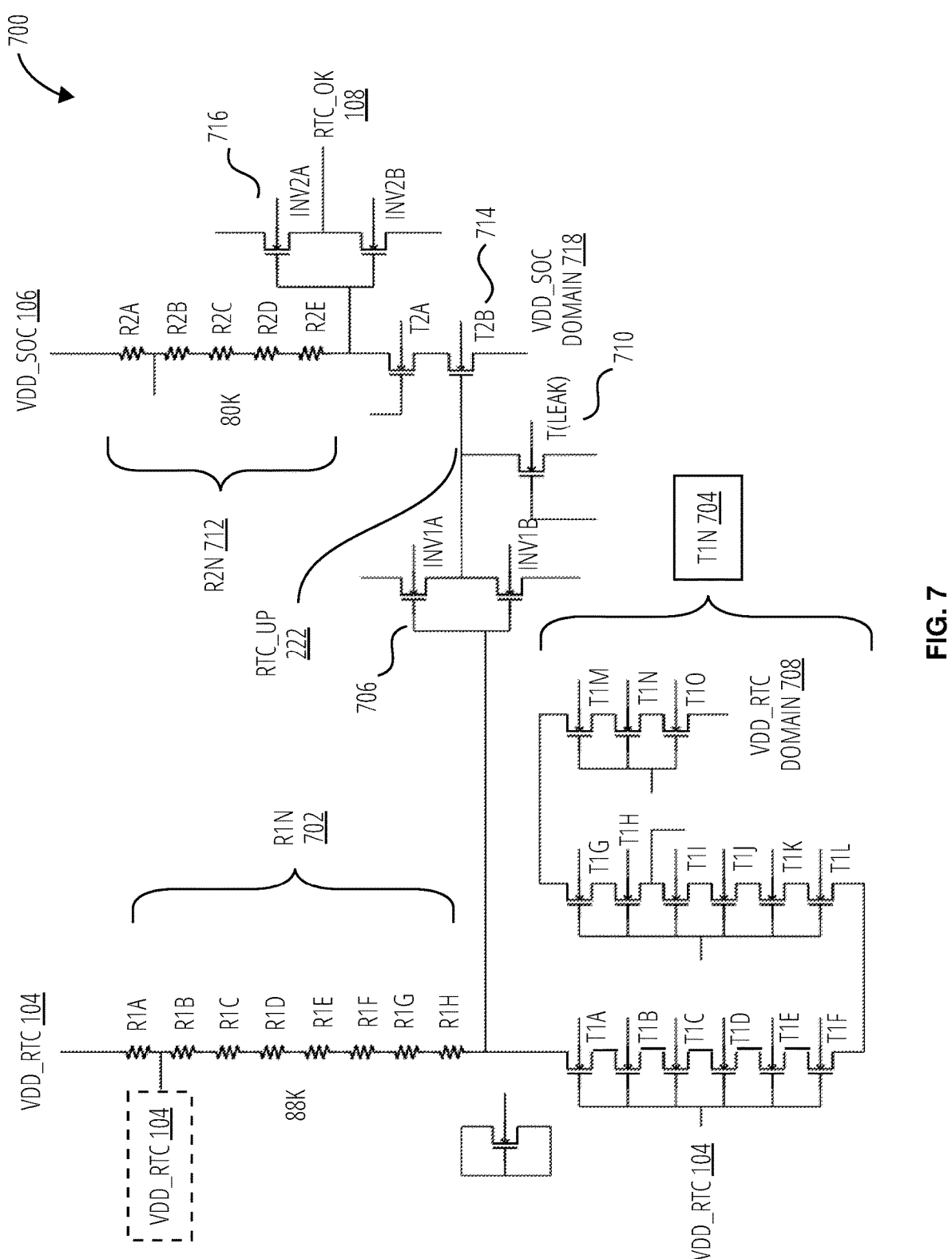
FIG. 7 illustrates a cross-domain glitch detection circuit 700 in accordance with one embodiment.

Referring to FIG. 6, a supply voltage profile 600 demonstrates a glitch detection threshold-based process using glitch detection circuits according to the disclosure where the power supply in one domain normally varies between a range of voltages.

In the illustrated example, a glitch attack may occur on a system-on-a-chip with a power rail (VDD_SOC 106) operating anywhere between 1.0V to 0.4V, and the glitch detection trip point (e.g., V_trip_down 504=0.6v) may be unaffected.

Utilizing a cross-domain glitch detection circuit such as one discussed in FIG. 2, a supply voltage VDD_RTC 104 in the VDD_RTC domain, when applied to a glitch detection circuit, may generate an RTC_UP 222 output that is passed to a ratioed inverter and used to drive a second pull-down transistor in the VDD_SOC domain. When the voltage VDD_RTC 104 is at a normal value (e.g., 0.75v), output RTC_UP 222=1. The second pull-down transistor T2 220 in the ratioed inverter 206 is ON, and a signal RTC_OK 108=1 is generated in the VDD_SOC domain.

In the illustrated example but not limited thereto, VDD_RTC is below a threshold value (e.g., V_trip_down 504<0.6v), and output RTC_UP 222=0. The second pull-down transistor in the ratioed inverter is OFF, and a signal RTC_OK 108=0 is generated in the VDD_SOC domain. When the value of RTC_OK 108=0, an alert may be triggered in the VDD_SOC domain based on an irregular voltage in the VDD_RTC domain.

Also referring to the illustrated example, VDD_RTC may be above a threshold value (e.g., V_trip_up 502>0.5v) resulting in output RTC_UP 222=0. The second pull-down transistor in the ratioed inverter would be OFF, and a signal RTC_OK 108=0 is generated in the VDD_SOC domain.

Because both trip points (V_trip_down 504<0.6v and V_trip_up 502>0.5v) are within the normal operating voltages of the VDD_SOC domain, it would not be possible to detect a glitch using circuits solely within the VDD_SOC domain with similar trip points as those used in the VDD_RTC domain.

Supply power voltage variation in the VDD_SOC domain does not affect the glitch detection trip point, which is independent of VDD_SOC voltage. However, supply power voltage variation may affect the response time when the VDD_RTC glitch detection circuit asserts or de-asserts through the pull-up resistor R2 212 in the ratioed inverter of the VDD_SOC domain. In various embodiments, the response time may be adjusted by replacing R2 212 with a different value resistor or by adding additional resistors in series with R2 212.

In the illustrated example, the glitch detection circuit may achieve a 68 mV glitch detection trip point variation across 3-sigma global process corners, within a −40 C to 125 C temperature range and 600 mv of power supply voltage range utilized by the system-on-a-chip. The maximum glitch detection trip point in this embodiment is 596 mV. The glitch detection trip point may be adjusted if required.

Referring to the cross-domain glitch detection circuit 700, a power rail voltage of the RTC domain, VDD_RTC 104, is coupled, either directly or indirectly, to a first pull-up resistor R1n 702 that is in series with a drain of first pull-down transistor T1n 704. R1n 702 may be a single resistor or a plurality of resistors in series (e.g., R1A-R1H). As an example, if a different resistance is desired, VDD_RTC 104 may be appled to the junction node between R1A and R1B instead of directly to R1A. In the illustrated example, pull-up resistor R1n 702 has a value of 88 k ohms. T1n 704 may be a single transistor or may be a plurality of transistors in series (i.e., stacked transistors T1A-T1O). These stacked transistors provide voltage driven resistance, thus providing a tunable circuit post silicon tuning. Additionally, VDD_RTC 104, is coupled, either directly or indirectly, to the gate of first pull-down transistor T1n 704.

A first inverter INV1A/B 706 may be coupled to a junction node of the first pull-up resistor R1n 702 and the drain of first pull-down transistor T1n 704. The source of the first pull-down transistor T1n 704 may be coupled, either directly or indirectly, to other devices in the VDD_RTC domain 708. The output signal from INV1A/B 706 is RTC_UP 222, which is passed to the ratioed inverter in the VDD_SOC domain.

Referring to the ratioed inverter, the signal RTC_UP 222 from the glitch detection circuit is coupled, either directly or indirectly, to the gate of a second pull-down transistor T2A/B 714. A voltage VDD_SOC 106 may be coupled, either directly or indirectly, to a second pull-up resistor R2n 712 in series with the second pull-down transistor T2A/B 714, which may be NMOS or PMOS. R2n 712 may be a single resistor or a plurality of resistors in series (e.g., R2A-R2E). As an example, if a different resistance is desired, VDD_SOC 106 may be applied to the junction node between R2A and R2B instead of directly to R2A. In the illustrated example, pull-up resistor R2n 712 has a value of 80K ohms. T2A/B 714 may be a single transistor or may be a plurality of transistors in series (i.e., stacked transistors T2A-T2B).

A second inverter INV2A/B 716 may be coupled to a junction node of the second pull-up resistor R2n 712 and the drain of the second pull-down transistor T2A/B 714. The source of the second pull-down transistor T2A/B 714 may be coupled, either directly or indirectly, to other devices in the VDD_RTC VDD_SOC domain 718. The output signal from the second inverter INV2A/B 716 is RTC_OK 108, which indicates whether an alert should be triggered in the VDD_SOC domain 718.

The cross-domain glitch detection circuit 700 may also include a leaker/off device T(leak) 710 to discharge residual charges. An additional function of the second pull-down transistor T2A may be to cut the parasitic RC charging path from the SoC to RTC_UP 222. In an embodiment, T1M-T1O of the first pull-down transistor T1n 704 are provided for post silicon tuning if required.

The specific voltages, amperages, and other details described above are for illustrative purposes only. The invention may be practiced using a variety of specific voltage levels, currents, resistances, and so forth. And while the invention has been described above in the context of e.g. a processor transmitting data to a memory, the PAM-4 etc. signaling techniques described herein may be practiced in any of a wide variety of signaling systems in which data is sent from a transmitting device to a receiving device, or between transceiving devices, and so forth.

Terms used herein should be accorded their ordinary meaning in the relevant arts, or the meaning indicated by their use in context, but if an express definition is provided, that meaning controls.

"Logic" herein refers to machine memory circuits, non-transitory machine-readable media, and/or circuitry that by way of its material and/or material-energy configuration comprises control and/or procedural signals, and/or settings and values (such as resistance, impedance, capacitance, inductance, current/voltage ratings, etc.), that may be applied to influence the operation of a device. Electronic circuits such as controllers, field programmable gate arrays, processors, and memory (both volatile and nonvolatile) comprising processor-executable instructions are examples of logic. Logic specifically excludes pure signals or software per se (however does not exclude machine memories comprising software and thereby forming configurations of matter).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will appreciate that logic may be distributed throughout one or more devices or components, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A cross-voltage domain glitch detection circuit configured to detect, in a second power domain, an instruction skipping, instruction decoding, or data read and write back voltage glitch in a power rail voltage of a first power domain, the circuit comprising:

a first voltage divider comprising (a) one or more first resistors coupled to a power rail of the first power domain, and (b) a first switch in the first power domain configured in series with the one or more first resistors;

a first inverter in the first power domain, the first inverter configured with an inverting input directly connected to a junction node of the first voltage divider;

a second voltage divider comprising (c) one or more second resistors coupled to a power rail of the second power domain, and (d) a second switch in the second power domain configured in series with the one or more second resistors;

an output of the first inverter directly connected to a first gate input of the second switch;

a second inverter in the second power domain, the second inverter configured with an inverting input directly connected to a junction node of the second voltage divider; and wherein an output of the second inverter is configured to signal the instruction skipping, instruction decoding, or data read and write back voltage glitch in the power rail voltage of the first power domain to circuits in the second power domain.

2. The circuit of claim 1, wherein the first power domain is a real-time clock power domain and the second power domain is a system-on-a-chip power domain.

3. The circuit of claim 1, wherein the output of the first inverter is directly connected to a source input of a third switch.

4. The circuit of claim 1, wherein the one or more second resistors are disposed between the second switch and the power rail of the second power domain.

5. The circuit of claim 1, wherein the first switch is further configured to tune a voltage at the junction node of the first voltage divider.

6. The circuit of claim 1, wherein a gate of the first switch is directly connected to the power rail of the first power domain.

7. An integrated circuit comprising:

a real-time clock in a first power domain;

a system-on-a-chip in a second power domain different that the first power domain;

cross-voltage domain glitch detection circuit configured to detect, in the second power domain, an instruction skipping, instruction decoding, or data read and write back glitch to the power rail voltage of the first power domain, the cross-voltage domain glitch detection circuit comprising:

a first voltage divider comprising (a) one or more first resistors coupled to a power rail of the first power domain, and (b) a first switch in the first power domain configured in series with the one or more first resistors;

a first inverter in the first power domain, the first inverter configured with an inverting input directly connected to a junction node of the first voltage divider;

a second voltage divider comprising (c) one or more second resistors coupled to a power rail of the second power domain, and (d) a second switch in the second power domain configured in series with the one or more second resistors;

an output of the first inverter directly connected to a first gate input of the second switch;

a second inverter in the second power domain, the second inverter configured with an inverting input directly connected to a junction node of the second voltage divider; and wherein an output of the second inverter is configured to signal the instruction skipping, instruction decoding, or data read and write back voltage glitch in the power rail voltage of the first power domain to circuits in the second power domain.

8. The integrated circuit of claim 7, wherein the output of the first inverter is directly connected to a source or drain input of a third switch.

9. The integrated circuit of claim 7, wherein the one or more second resistors are disposed between the second switch and the power rail of the second power domain.

10. The integrated circuit of claim 7, wherein the first switch is further configured to tune a voltage at the junction node of the first voltage divider.

11. The integrated circuit of claim 7, wherein a gate of the first switch is directly connected to the power rail of the first power domain.

* * * * *